US008418849B2

(12) United States Patent
Davis et al.

(10) Patent No.: US 8,418,849 B2
(45) Date of Patent: Apr. 16, 2013

(54) STORAGE AND PACKAGING DRAWER DEVICE

(75) Inventors: Jerald Daniel Davis, La Crescenta, CA (US); Michael E. Whitney, Santa Clarita, CA (US)

(73) Assignee: Multi Packaging Solutions, Inc., Lansing, MI (US)

( * ) Notice: Subject to any disclaimer, the term of this patent is extended or adjusted under 35 U.S.C. 154(b) by 0 days.

(21) Appl. No.: 13/180,887

(22) Filed: Jul. 12, 2011

(65) Prior Publication Data

US 2012/0062089 A1   Mar. 15, 2012

Related U.S. Application Data

(60) Provisional application No. 61/363,362, filed on Jul. 12, 2010, provisional application No. 61/448,864, filed on Mar. 3, 2011.

(51) Int. Cl.
*B65D 85/57* (2006.01)

(52) U.S. Cl.
USPC ........................................ 206/312; 206/308.1

(58) Field of Classification Search ............... 206/308.1, 206/311–313, 425
See application file for complete search history.

(56) References Cited

U.S. PATENT DOCUMENTS

| 1,551,302 | A |   | 8/1925  | Gabel              |         |
|-----------|---|---|---------|--------------------|---------|
| 4,095,690 | A | * | 6/1978  | Baldwin ........... | 206/312 |
| 4,653,639 | A |   | 3/1987  | Traynor            |         |
| 4,730,727 | A | * | 3/1988  | Petroff ........... | 206/311 |
| 5,099,995 | A | * | 3/1992  | Karakane et al. ...| 206/308.1 |
| 5,360,107 | A |   | 11/1994 | Chasin et al.      |         |
| 5,421,452 | A | * | 6/1995  | Hybiske ...........| 206/312 |
| 5,422,875 | A |   | 6/1995  | Bribach            |         |
| 5,450,953 | A |   | 9/1995  | Reisman            |         |
| 5,735,396 | A |   | 4/1998  | Condorodis         |         |
| 6,024,214 | A | * | 2/2000  | Cowan ............. | 206/308.1 |
| 6,032,795 | A |   | 3/2000  | Ehrlund et al.     |         |
| 6,105,762 | A |   | 8/2000  | Pettey             |         |
| 6,290,060 | B1| * | 9/2001  | Burtch ............| 206/312 |
| 6,296,112 | B1|   | 10/2001 | Pettey             |         |
| 6,360,890 | B1|   | 3/2002  | Proffit            |         |
| 6,364,110 | B2| * | 4/2002  | Johnson ...........| 206/425 |
| 6,419,083 | B1| * | 7/2002  | Huang .............| 206/308.1 |
| 6,659,336 | B2|   | 12/2003 | Brennan            |         |
| 7,044,293 | B2|   | 5/2006  | Exline             |         |
| 7,090,079 | B2|   | 8/2006  | Ehrlund            |         |
| 7,328,790 | B2|   | 2/2008  | Andersen           |         |
| 7,556,148 | B2|   | 7/2009  | Skarin             |         |

(Continued)

FOREIGN PATENT DOCUMENTS

DE   202007007503   7/2007
GB       2397290    7/2004

OTHER PUBLICATIONS

International Search Report & Written Opinion dated Oct. 13, 2011 (PCT/US2011/043699).
International Preliminary Report on Patentability dated Nov. 8, 2012; Application No. PCT/US2011/043699.

*Primary Examiner* — Bryon Gehman
(74) *Attorney, Agent, or Firm* — The Dobrusin Law Firm, PC

(57) ABSTRACT

A packaging and storage device which includes one or more paperboard drawer structures which may be stacked and connected to form a book-like arrangement.

17 Claims, 10 Drawing Sheets

U.S. PATENT DOCUMENTS

| | | |
|---|---|---|
| D609,563 S | 2/2010 | Daum et al. |
| 7,708,138 B2 | 5/2010 | Gelardi et al. |
| 2004/0245137 A1 | 12/2004 | Gelardi |
| 2006/0042968 A1* | 3/2006 | Goldberg ................ 206/308.1 |
| 2006/0289318 A1 | 12/2006 | Gelardi et al. |
| 2009/0302097 A1 | 12/2009 | Vincent |
| 2010/0000891 A1 | 1/2010 | Woodhead et al. |
| 2010/0044258 A1 | 2/2010 | Siecke |

* cited by examiner

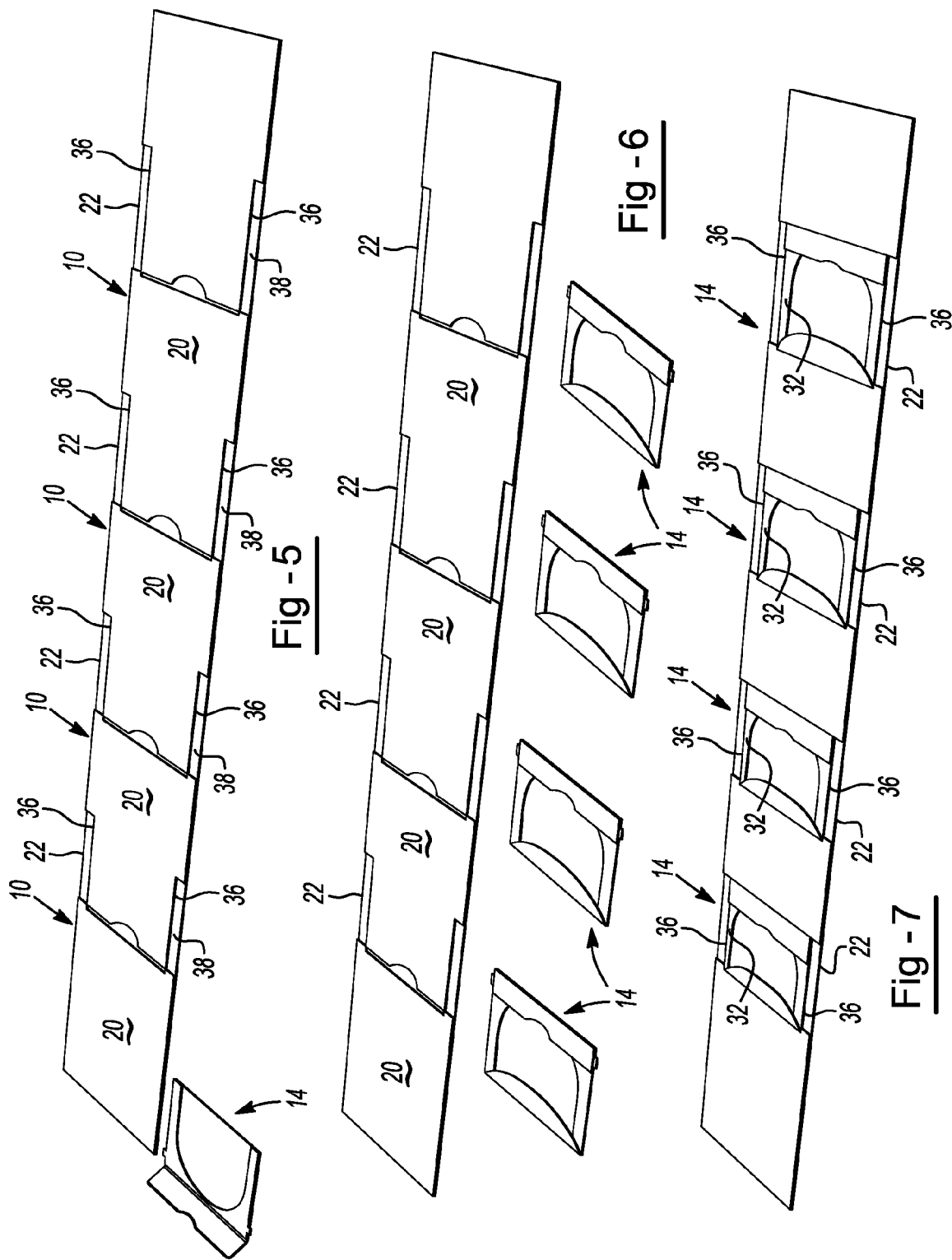

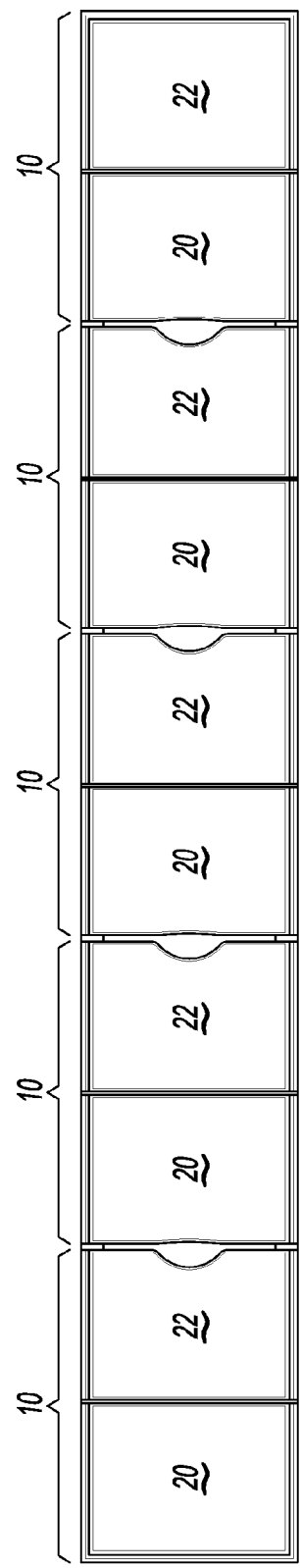
Fig - 11
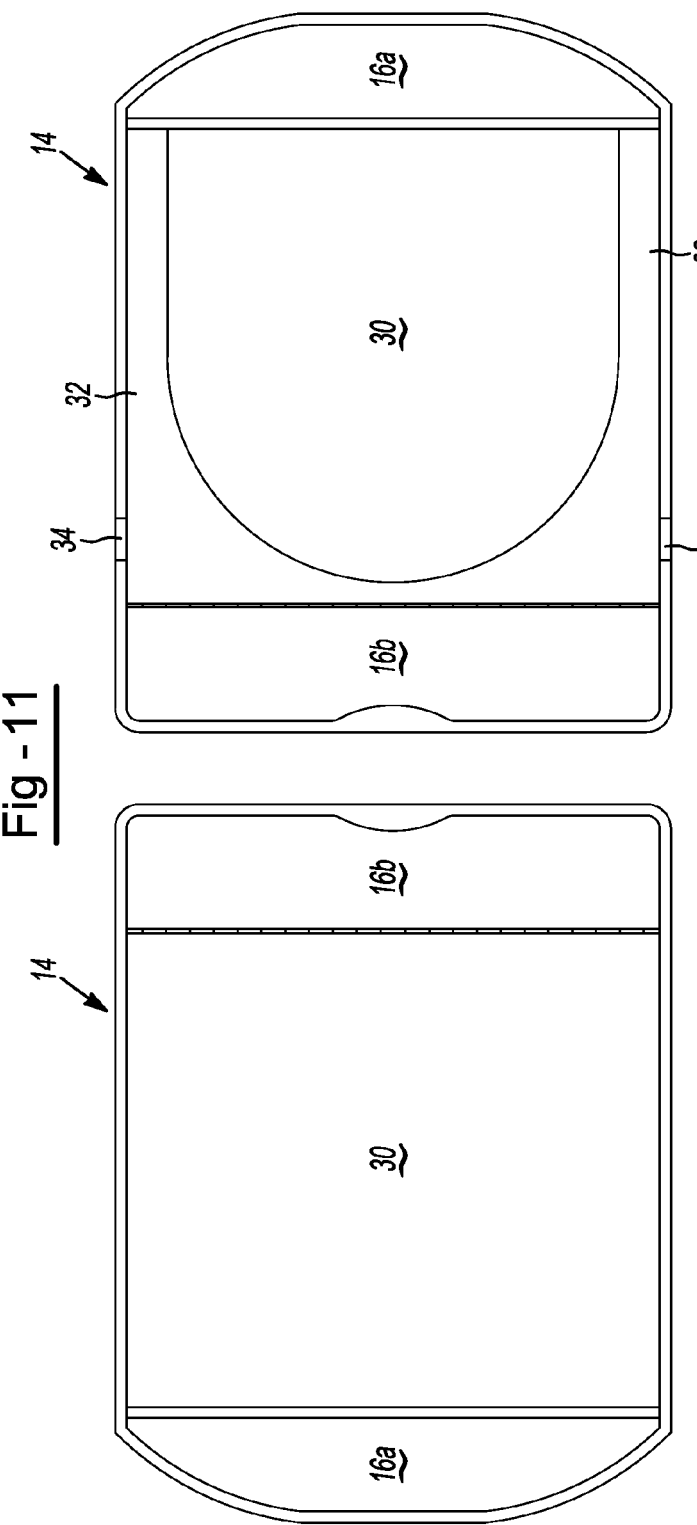
Fig - 12A
Fig - 12B

STORAGE AND PACKAGING DRAWER DEVICE

CLAIM OF PRIORITY

This application claims the benefit of the filing dates of U.S. Provisional Application Nos. 61/363,362, filed on Jul. 12, 2010, and 61/448,864 filed Mar. 3, 2011 the contents of which are incorporated by reference herein for all purposes.

FIELD OF THE INVENTION

The present teachings relate generally to paperboard drawer and book structures for packaging and storing articles and more specifically to a plurality of connected paperboard drawer structures that are that are stacked and attached in a book-like arrangement.

BACKGROUND OF THE INVENTION

Media storage devices are often sufficiently fragile that specialized packaging is developed in an effort to prevent damage to the devices. As an example, compact discs and DVDs are often packaged so that movement of the disc within the packaging is limited thereby reducing the likelihood of scratching the disc. As more improved and advanced storage mediums are developed, new considerations must be taken into account in the interest of minimizing damage to these new storage mediums during shipment and storage. As an example, Blu-ray discs are even more sensitive to scratching than traditional disc storage mediums. Accordingly, the packaging and storage devices for these types of sensitive storage mediums must include additional mechanisms to prevent damage to the storage mediums during storage and transport.

It is also desirable that packaging for storage mediums provide a reusable package in which the storage mediums can be permanently stored while not in use. Thus, it is further desirable that the packaging for storage mediums include an attractive outer surface that allows for maximum decorative space for pleasing aesthetic appearance during storage. The packaging may also include multiple interior surfaces in an effort to maximize the amount of informational and design space for marketing purposes.

Accordingly, in view of the above, there exists a need for product packaging that minimizes damage to contents by providing internal structures for limiting movement of the contents and for safe removal of the contents. There is also a need for a packaging that provides storage space so that the contents can be removed from and replaced into the packaging. There is a further need for packaging that includes an exterior surface and a maximum amount of interior surfaces for providing design and informational aspects.

SUMMARY OF THE INVENTION

The present teachings meet some or all of the above needs by providing a packaging including a shell portion encasing one or more drawer structures and/or internal envelopes. Each drawer structure may include a panel having one or more retaining structures located thereon. Each retaining structure may have a height that is equal to or greater than that of item to be located in the drawer structure. The retaining structures may be located on the panel so that they form a receiving surface for an item so that the receiving surface substantially corresponds to the shape and size of the item to be received.

The packaging may include one or more internal envelopes and/or one or more drawer structures located within the one or more internal envelopes. Each of the internal envelopes may include a first panel and a second panel, each panel having an outside edge, an inside edge and one or more side edges. The first and second panels may be connected along at least a portion of the outside edge of each panel. The outside edge may include an opening located therein. One or more support structures may be located between the first panel and the second panel and may form one or more closed edges between the first and second panels. At least a portion of the first and second panels may lie in direct planar contact with one another and may be adhered to one another. Each of the drawer structures may include a receiving surface, a first folded edge located adjacent the receiving surface, a second folded edge located adjacent the receiving surface and opposing the first folded edge, a retaining structure in planar contact with the receiving surface and at least one tab integrally formed with the retaining structure. The drawer structures may be moved to an open position by pulling the drawer through the opening in the outside edge of the internal envelope. Alternatively, the drawer structures may be free of any envelope structure. The envelope structure may also be free of any drawer structure, so that an item is located directly into the internal envelope.

Advantageously, the drawer structures may be formed so that when a drawer is pulled from within an internal envelope into the open position, the drawer is prevented from being completely removed from the envelope by the one or more tabs integrally formed with the retaining structure. The tabs may contact an interior portion of the envelope (e.g., a closed edge portion) so that the contact between the tab and interior portion prevents the drawer structure from being completely removed from the internal envelope. Among the various features that the packaging may exhibit that can contribute to its advantages is that a shell portion can enclose multiple internal envelopes, each may or may not contain at least one drawer. The shell portion and each internal envelope may be attached along one edge to form a binding so that a top surface (e.g., a first surface) of the shell portion forms a front cover and a bottom surface (e.g., a second surface) of the shell portion forms a back cover. The internal envelopes may be located between top surface and bottom surface of the shell portion.

The teachings herein contemplate a device and method for the packaging and storage of goods wherein the goods are located onto and/or within paperboard drawer structures and/or internal envelopes. The packaging disclosed herein may allow for the secure containment of media storage devices, especially where minimal damage (e.g., scratching) to the storage device may result in destroyed functionality of the storage device. The drawers and envelopes may include retaining structures that are shaped to correspond with the shape of the goods intended for placement within the drawer structures. The drawer structures may further include features for minimizing direct contact with the goods within the drawer to further protect the goods from damage.

BRIEF DESCRIPTION OF THE DRAWINGS

FIG. 5 is a perspective view of an illustrative example of multiple connected internal envelopes shown prior to assembly.

FIG. 6 is a perspective view of the internal envelopes of FIG. 5 and multiple drawer structures shown prior to placement of the drawer structures within the internal envelopes.

FIG. 7 is a perspective view of the internal envelopes and drawer structures of FIG. 6 shown after placement of the drawer structures within the internal envelopes.

FIG. 11 is a top-down view of an illustrative example of multiple connected internal envelopes in accordance with the present teachings.

FIG. 12A is a top-down view of an illustrative example of a single drawer structure in accordance with the present teachings.

FIG. 12B is a top-down view of the single drawer structure of FIG. 12A shown with a connected retaining structure.

DETAILED DESCRIPTION

Figure 1:
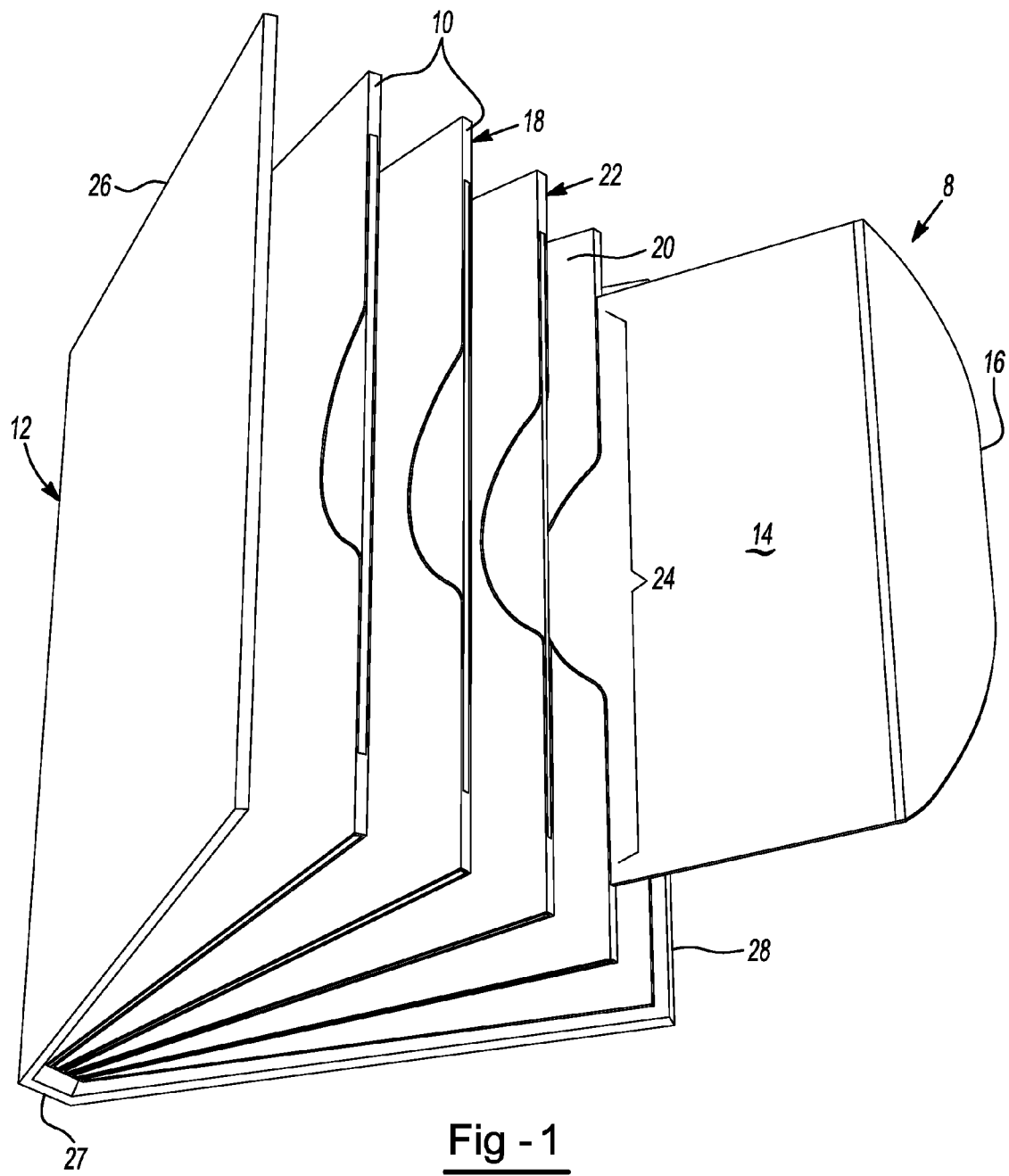
FIG. 1 is a perspective view of an illustrative example of the packaging of the present teachings.

In general, the teachings described herein provide for a packaging that includes at least one drawer structure and/or at least one internal envelope. The drawer structure may have a retaining structure located thereon. The at least one drawer structure may be located within at least one internal envelope. The packaging may include only drawer structures and no internal envelopes. The packaging may include only internal envelopes and no drawer structures. The at least one internal envelope may include a first panel having two side edges, an outside edge connected to at least a portion of the first panel and a second panel having two side edges and connected to the outside edge of the first panel along at least a portion of the second panel. The outside edge may include one or more openings so that a drawer structure or a storage item can be placed within the envelope and at least a portion of the drawer structure or storage item can be pulled through the one or more openings. One or more support structures may be located between the first panel and second panel for forming at least one closed edge along the side edges of the first panel and second panel. At least a portion of the first panel and second panel may be arranged in planar contact with one another. Each drawer structure may include a receiving surface and a retaining structure in planar contact with the receiving surface. The retaining structure may also include one or more tabs so that when the drawer structure is pulled through the one or more openings in the outside edge of the internal envelope, the one or more tabs may contact a surface within the internal envelope so that the drawer structure cannot be completely removed from within the internal envelope. The internal envelopes and corresponding drawer structures may be assembled so that multiple internal envelopes are attached to one another along an inside edge of each internal envelope to form a book-like structure. The assembled packaging may further include a shell portion (e.g., a cover) having a top surface, a bottom surface and a connecting surface connecting the top surface to the bottom surface. The connecting surface may contact or be located adjacent to the connected inside edges of each internal envelope or each drawer structure to form a book spine.

Each internal envelope may include a first panel and a second panel so that when the packaging is assembled, the first panel is folded over into planar contact with the second panel. A portion of the first panel may be adhered to the second panel. When the packaging is assembled, an outside edge may be formed at the fold line where the first panel is folded over the second panel. One or more openings may be located along the outside edge. The opening may be large enough so that at least a portion of a drawer structure located within the internal envelope can be pulled through the opening and any items located within the drawer structure can be viewed, removed, and/or replaced into the drawer structure. The opening may be sufficiently long so that an item can be located into and out of the envelope through the opening, but not so long that an item may unintentionally exit the envelope. The opening may be located along the outside edge of the internal envelope so that it extends along the entire outside edge. The opening may also extend along only a portion of the outside edge. The outside edge may include portions where the first panel and second panel remain connected (e.g., portions having no opening). Each internal envelope may also include one or more support structures located along the first panel, the second panel, or both panels. The support structure may be located onto one or both panels so that when the first panel is folded onto the second panel, the support structures are located in between the two panels. The support structures may be located along the side edges of the first and/or second panels. The support structures may be located at any location along either panel so that a space is created between the two panels. The support structures may also provide additional rigidity to the panels. The support structures may be arranged so that a drawer structure located within the internal envelope is located adjacent to the support structure. The support structures may also lie directly below and/or above the drawer structure.

Each drawer structure may be located within an internal envelope such that the drawer structure is placed in between the first panel and the second panel of the internal envelope. One or more drawer structures may be free of an internal envelope or located outside of an internal envelope. Each drawer structure may include a receiving surface, a retaining structure and one or more folded edge portions. The receiving surface may include an outside edge, an inside edge and one or more side edges. The receiving surface may include a fastening means for connecting the retaining structure to the receiving surface. The fastening means may include an adhesive or mechanical fastener for maintaining the retaining structure in contact with the receiving surface. The retaining structure may be located in planar contact with the receiving surface. The retaining structure may be arranged at an angle in relation to the receiving surface. The retaining structure may be shaped so that it retains items of a specific shape and size within the drawer structure. As an example, the retaining structure may be curved so that a flat, rounded item such as a disc (e.g., a DVD, CD, Blu-ray Disc®, or other media storage device) may be placed into the drawer structure and held securely in place by the retaining structure. Alternatively, the internal envelope may be formed so that an area conforming to the shape of an intended package contents exists in between the first panel and second panel such that surrounding portions of the first panel and second panel are adhered to one another. It is highly desirable for many fragile media storage devices that the shape of any retaining structure be specifically customized to prevent movement of an item within a drawer structure. The drawer structures may also include one or more folded edge portions. The folded edge portions may be located along any edge of the receiving surface. The outside edge of the receiving surface may include a folded edge portion. The inside edge of the receiving surface may include a folded edge portion. The folded edge portion may assist the retaining structure in maintaining any drawer contents within the drawer structure by limiting and/or preventing movement of the contents. The folded edge portion may also fold over an item located within the drawer structure so that when the drawer structure is pulled through the opening in the internal envelope, direct contact with the item is prevented thereby reducing the risk of damage to the item. The retaining structure may also include a depression portion or opening that may be located adjacent an item located in contact with the retaining structure. The depression portion or opening may allow a user to more easily contact an edge of an item located in the drawer structure so that the item can be removed. The retaining structure may include printed indicia. A disc located within the drawer structure may also include printed indicia so that the indicia on both the disc and the retaining structure appears as one continuous design, photo, or the like.

Upon assembly, one or more internal envelopes and/or one or more drawer structures located therein may be connected and placed within a shell portion. The internal envelopes may be connected along the inside edge of each envelope. The drawer structures may be connected along an inside edge of each drawer structure. The outside edge of each envelope through which the drawer structures are removed may be free to be easily accessed. The shell portion may include a top surface, a bottom surface and a connecting surface for connecting the top surface to the bottom surface. The connecting surface may be attached or adjacent to connected inside edges of the internal envelopes and/or inside edges of the drawer structures.

The packaging may be formed by laying multiple attached internal envelopes in an open format, each open envelope including a first panel and a second panel. The packaging may be formed by laying multiple attached drawer structures in an open format, each drawer including a first panel and a second panel, the panels being attached in planar contact with one another. A drawer structure may be assembled onto one or more panels of the internal envelopes. The drawer structures may be assembled with no internal envelopes. The drawer structures may be formed by attaching all or a portion of the drawer structure to one or more panels of the internal envelopes. The receiving surface of a drawer structure may be attached via an adhesive or another mechanical attachment means including a fastener, clip, staple or the like. The receiving surface may include a retaining structure prior to attachment to the internal envelope or the retaining structure may be attached to the receiving surface after attachment of the receiving surface to the internal envelope. The first panel of each internal envelope may then be folded over the second panel of the internal envelope so that the first and second panels of the internal envelopes are at least partially in planar contact with one another and each drawer structure is located therebetween. The internal envelopes may also be fitted with one or more support structures so that the support structures lie between the first panel and second panel after folding. The support structures may be located along the side edges of the first and second panel so that that the side edges are closed edges after folding the first panel onto the second panel. The support structures may be adjacent the drawer structures (e.g., adjacent the retaining structure of the drawers) or may be located above or beneath the drawer structure or a portion of the drawer structure.

As shown for example in FIG. 1, the packaging 8 may include one or more internal envelopes 10 folded and connected along an inside edge 12. Each internal envelope 10 may contain a drawer structure 14 located within, having one or more folded edge portions 16. Each internal envelope 10 may include an outside edge 18 connected to a first panel 20 and a second panel 22. The outside edge 18 may also include an opening 24 for pulling the drawer structure 14 through. The packaging may further include a shell portion having a top surface 26, a bottom surface 28 and a connecting surface 27.

Figure 2:
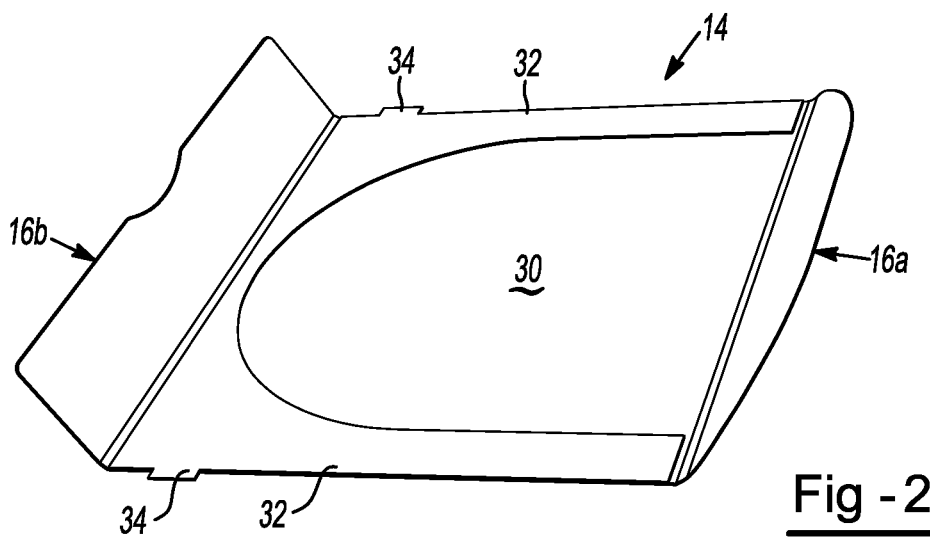
FIG. 2 is a perspective view of an illustrative example of single drawer structure in accordance with the present teachings.
Figure 3:
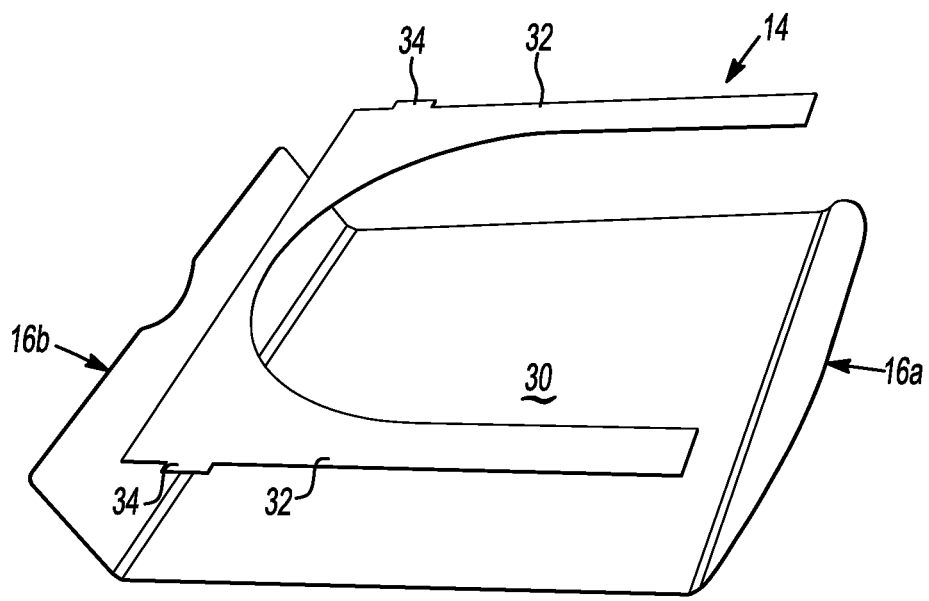
FIG. 3 is a perspective view of the single drawer structure of FIG. 2, shown prior to connection of the retaining structure to the receiving surface.
Figure 4:
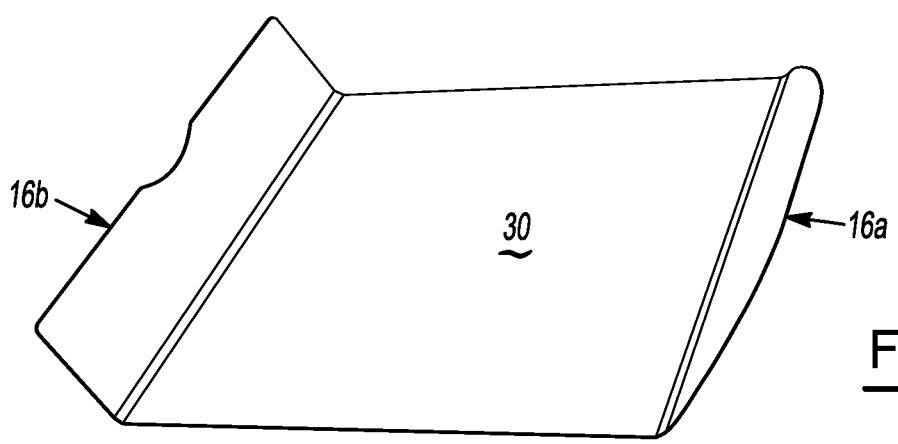
FIG. 4 is a perspective view of the receiving surface of the drawer structure of FIG. 2.

FIG. 2 shows an illustrative example of a single drawer structure 14. The drawer structure 14 is shown having two folded edge portions 16a, 16b, a receiving surface 30 and a retaining structure 32 in planar contact with the receiving surface 30. The retaining structure 32 is further shown having one or more tabs 34 integrally formed with the retaining structure 32. FIG. 3 shows the drawer structure 14 of FIG. 2 prior to attachment of the retaining structure 34 to the receiving surface 30. FIG. 4 shows the receiving surface 30 alone with the two folded edge portions 16a, 16b.

Figure 8:
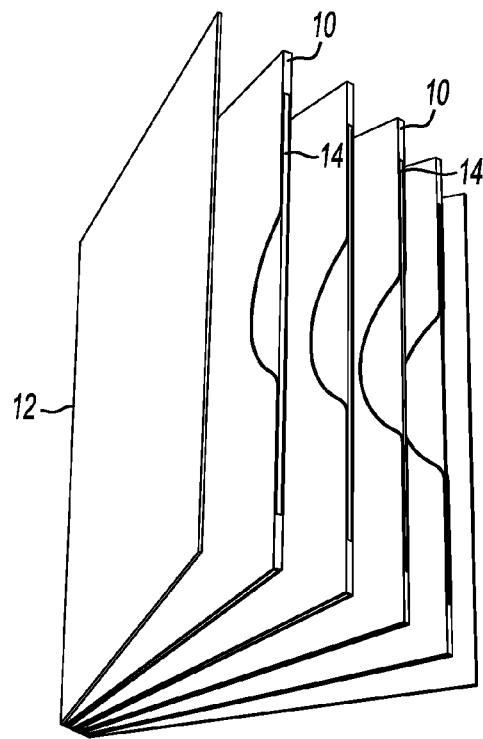
FIG. 8 is a perspective view of the internal envelopes and drawer structures of FIG. 7 shown folded and connected along an edge of each internal envelope.

FIG. 5 shows an example of multiple attached internal envelopes 10 shown prior to insertion of the drawer structures 14 and prior to assembly of the packaging. Each internal envelope includes a first panel 20 and a second panel 22. Support structures 36 are shown along the side edges 38 of each second panel 22 for providing closed side edges when each first panel 20 is folded onto each second panel 22. FIG. 6 includes the attached internal envelopes 10 of FIG. 5 and the drawer structures 14 shown prior to attachment of the drawer structures to the second panels 22 of each internal envelope 10. FIG. 7 shows the drawer structures 14 attached to the second panels 22 of each internal envelope 10. The support structures 36 are shown lying adjacent to the retaining structures 32. The assembled drawer structures 14 and internal envelopes 10 are then folded and assembled as shown in FIG. 8. The internal envelopes 10 are connected along an inside edge 12 of each envelope.

Figure 9:
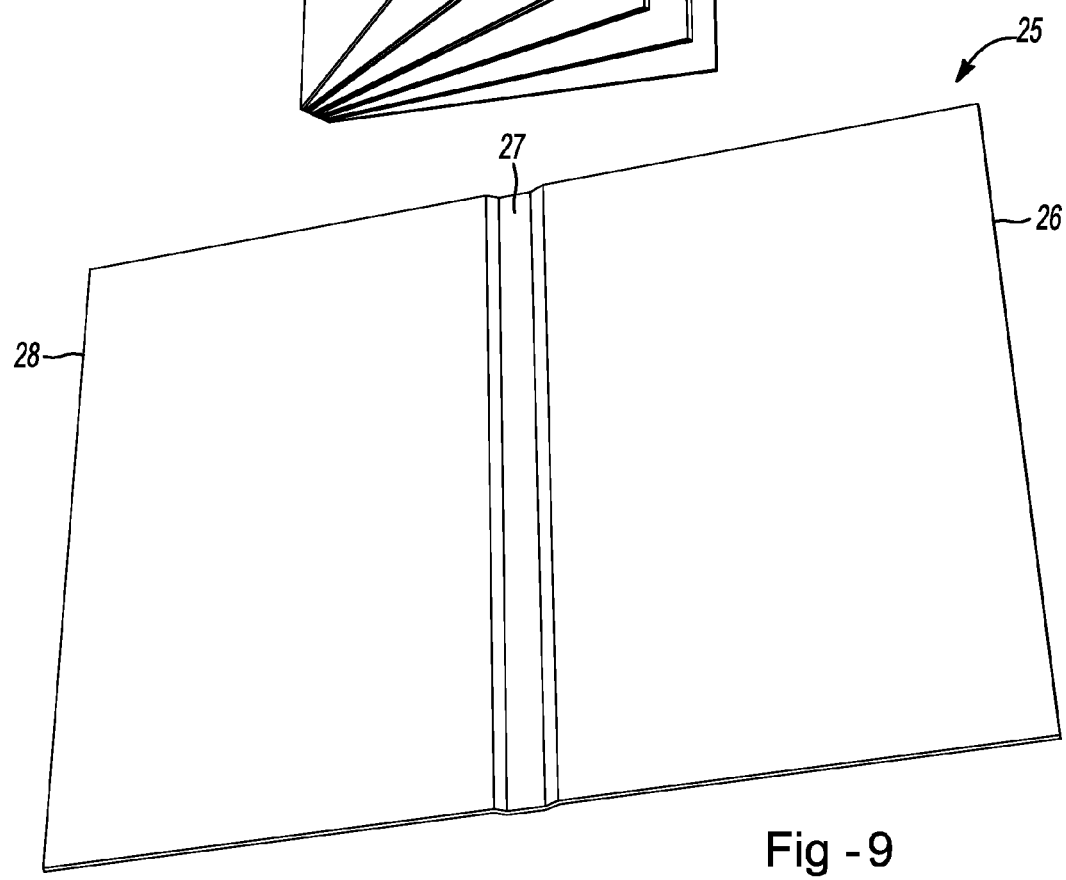
FIG. 9 is a perspective view of a shell portion prior to connection of the shell portion.
Figure 10:
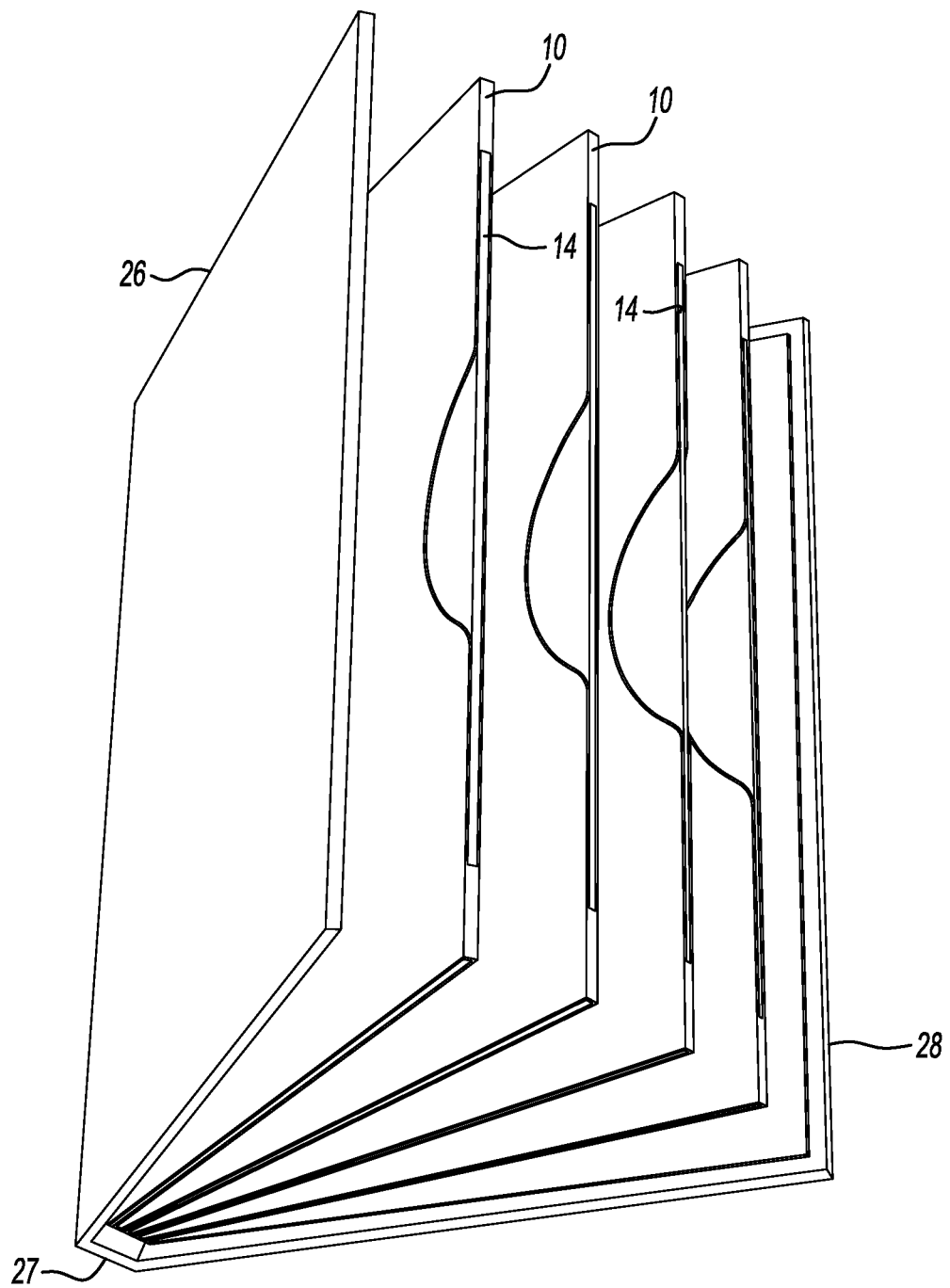
FIG. 10 is a perspective view of the folded and connected internal envelopes and drawer structures shown with the shell portion attached to and encasing the folded internal envelopes and drawer structures.

A shell portion 25 is shown in FIG. 9 prior to attaching the shell portion 25 to the assembled internal envelopes 10 and drawer structures 14 (as shown in FIG. 8). The shell portion 25 having a top surface 26, a bottom surface 28 and a connecting surface 27 is shown in FIG. 10 attached to the assembled internal envelopes 10 and drawer structures 14.

FIG. 11 shows an additional illustrative example of multiple attached internal envelopes 10 prior to attachment of any drawer structures. Each internal envelope includes a first panel 20 and second panel 22. FIGS. 12A and 12B both show a portion of a single drawer structure 14. FIG. 12A shows a receiving surface 30 including folded edge structures 16a, 16b. FIG. 12B shows the receiving surface 30 of 12A also including a retaining structure 32 having multiple tabs 34.

Figure 13:
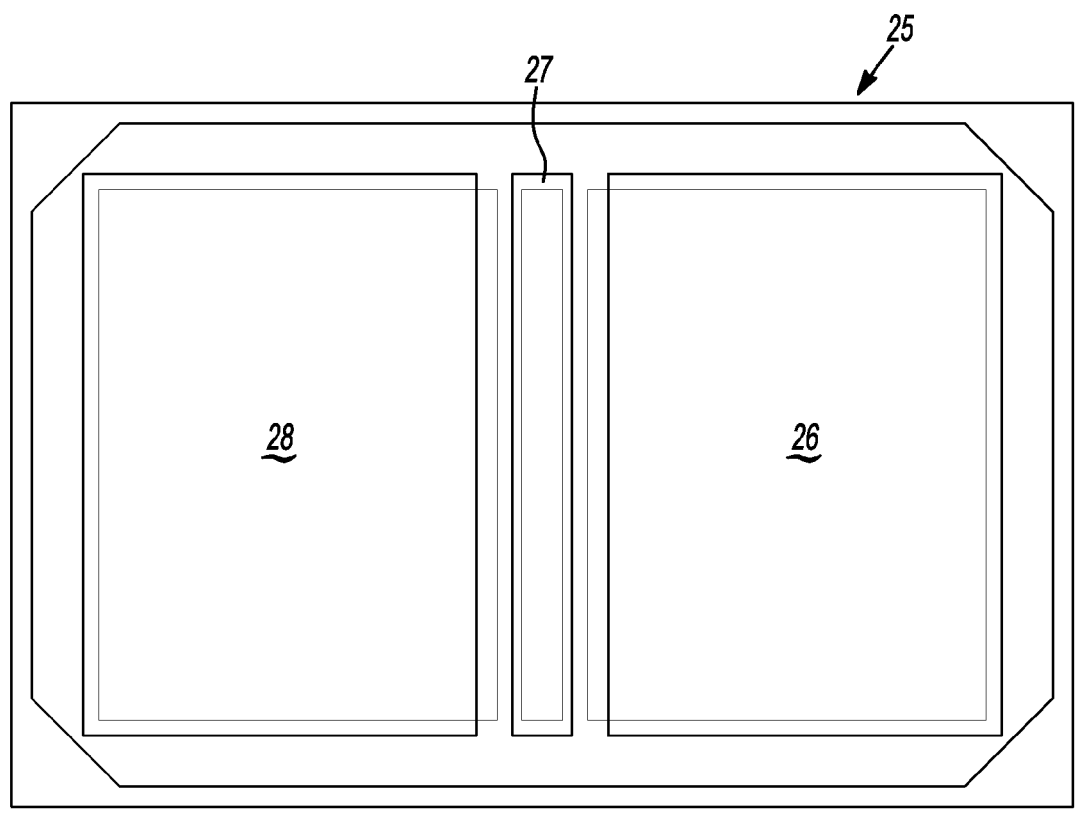
FIG. 13 is a top down view of an illustrative example of a shell portion in accordance with the present teachings.

FIG. 13 shows the shell portion 25 having a top surface 26, a bottom surface 28 and a connecting surface 27.

Figure 14:
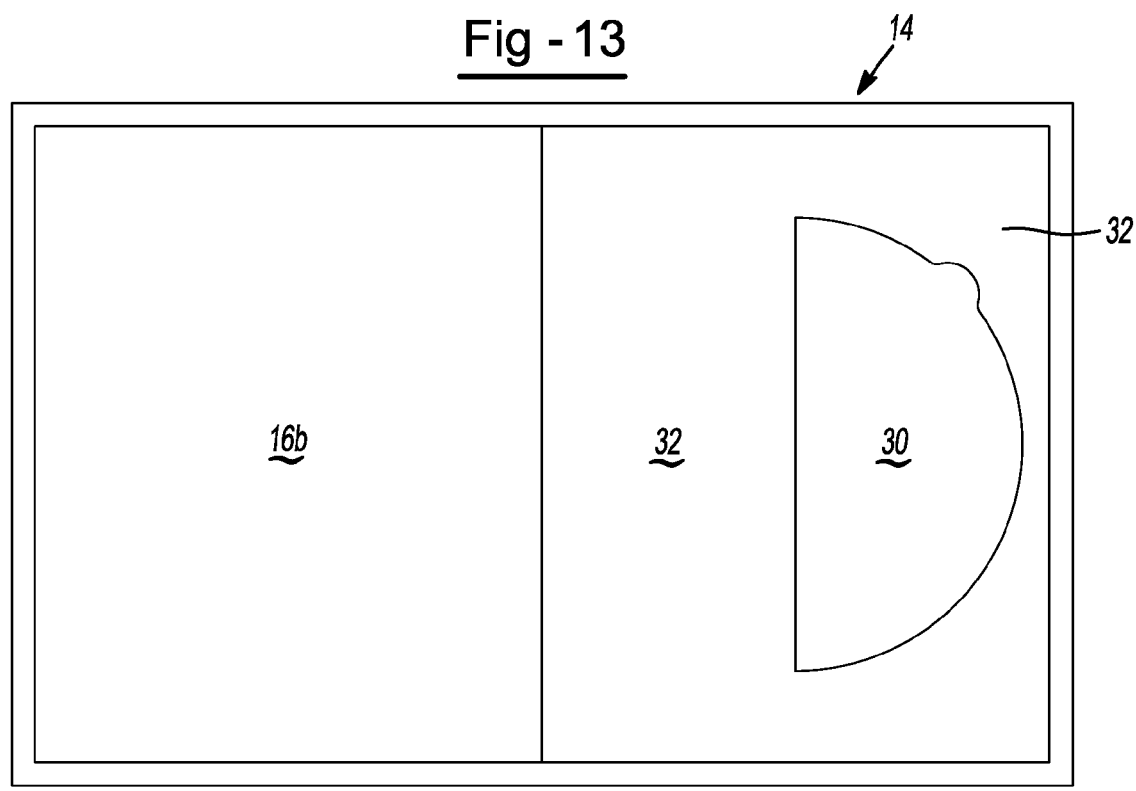
FIG. 14 is a top down view of an illustrative example of a non-moveable drawer structure.
Figure 15:
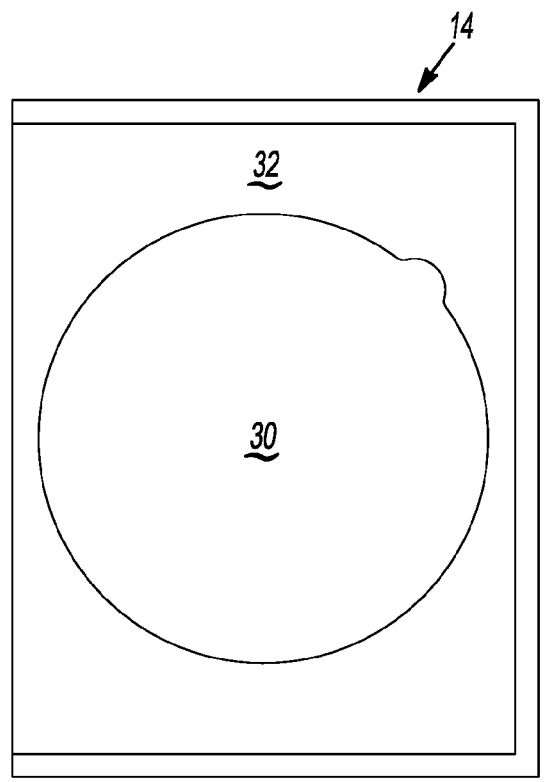
FIG. 15 is a top down view of an illustrative example of a non-moveable drawer structure.
Figure 16:
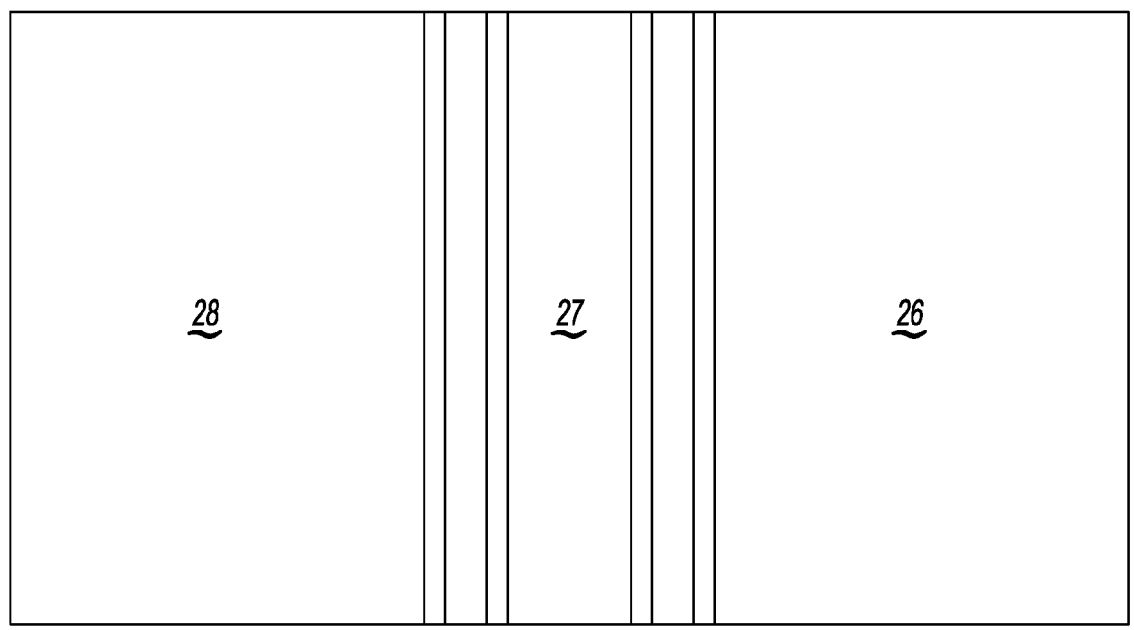
FIG. 16 is a top down view of an illustrative example of a shell portion in accordance with the present teachings.

FIG. 14 shows an example drawer structure 14 having a receiving surface 30 formed as a half circle and a retaining structure 32 located about the receiving surface 30. Upon insertion of a disc onto the receiving surface 30, the entire disc may be located adjacent or above the retaining structure 32. Alternatively, a portion of the disc may be located below the retaining structure 32. When the packaging is closed, the folded edge portion 16b may cover at least a portion of the retaining structure and any disc located on the receiving surface 30. FIG. 15 shows an example drawer structure 14 having an alternative receiving surface 30 formed as a full circle being substantially surrounded by the receiving surface. FIG. 16 shows an example shell portion 25 having a top surface 26, a bottom surface 28 and a connecting surface 27.

Figure 17:
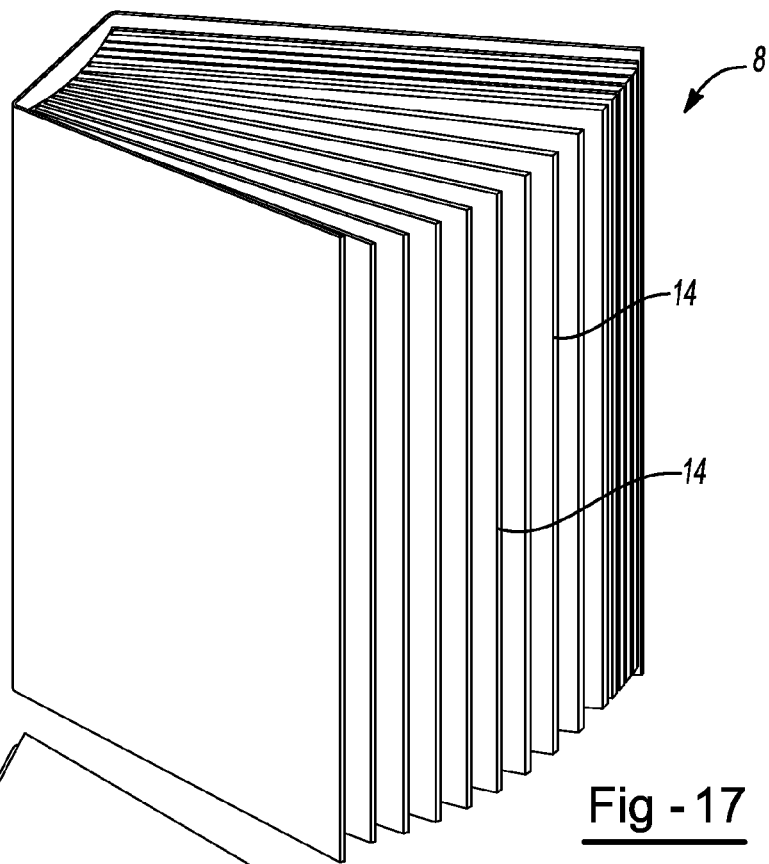
FIG. 17 is a perspective view of an illustrative example of multiple connected non-movable drawer structures shown with the shell portion attached to and encasing the drawer structures.
Figure 18:
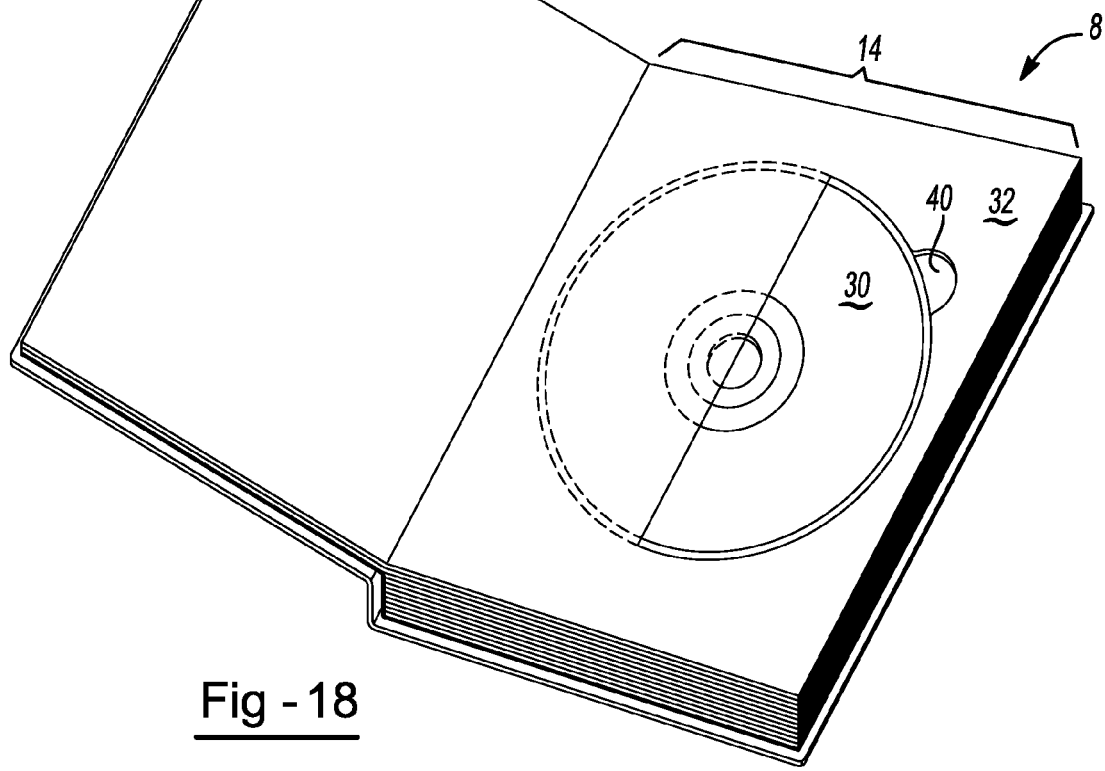
FIG. 18 is a top-down view of the drawer structure of FIG. 15 shown located within a shell portion.

FIG. 17 shows an example assembled packaging 8 including a plurality of drawer structures 14 assembled without being located in any envelope structure. FIG. 18 shows the packaging 8 of FIG. 17 including drawer structures 14 such as those shown at FIG. 15. The drawer structures 14 are shown including a depression portion 40 formed within the retaining structure 32, to allow a user to grip any item located onto the receiving surface 30. The receiving surface 30 may also include a fastening means (not shown) that may be located into an opening formed on item placed into the drawer structure.

Figure 19:
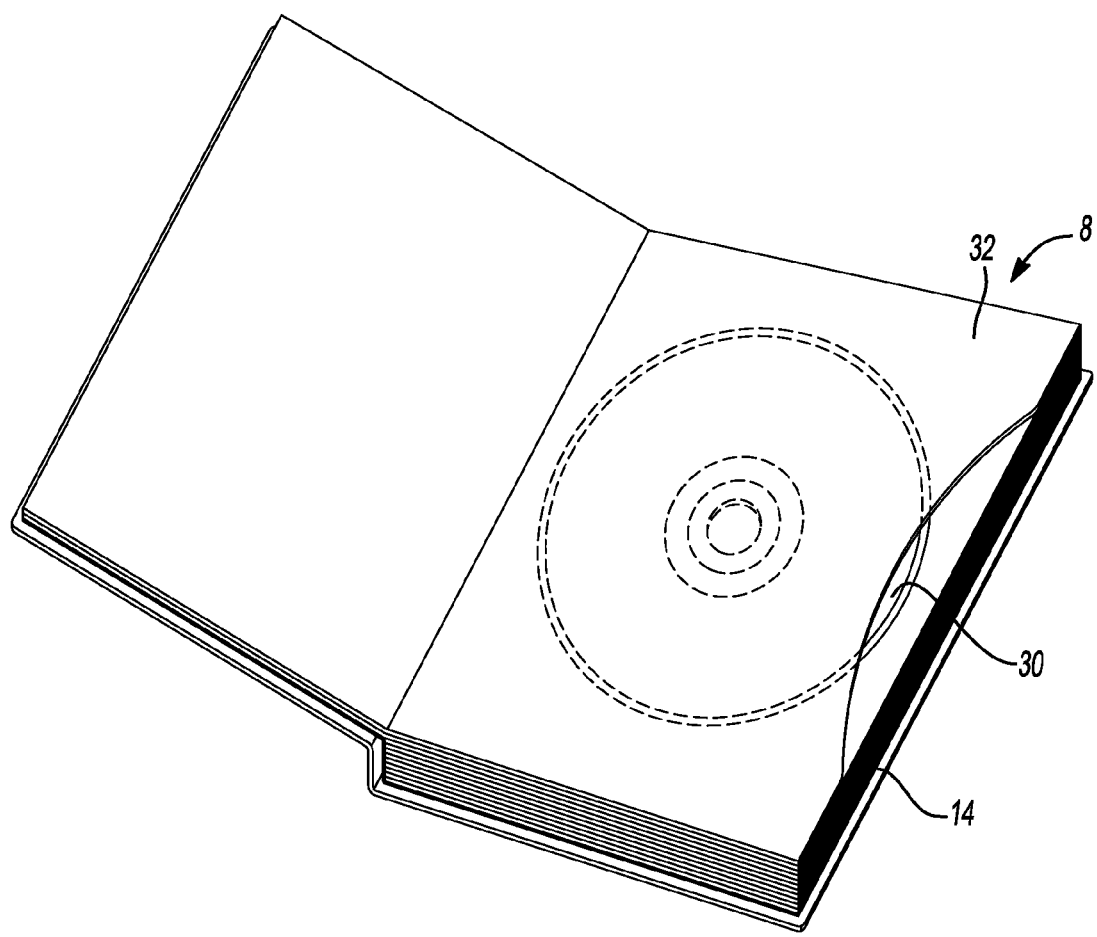
FIG. 19 is a perspective view of an illustrative example of an internal envelope in accordance with the current teachings.

FIG. 19 shows an example internal envelope 10 wherein the first panel 20 and second panel 22 are at least partially adhered to one another so that an opening 44 exists in between the first panel 20 and second panel 22 that corresponds to the shape of an item that will be located into the envelope. One or more panels of the internal envelopes may include a cut-out 46 to allow a user to easily contact an item located within the internal envelope.

The substrate for forming the internal envelopes and drawer structures may be any material pliable enough to be scored and folded but strong enough to withstand the weight of a contained article. The shell portion may be formed of materials similar to those used for forming other aspects of the packaging. The shell portion may also be formed of more rigid material for protecting the packaging contents and also the internal envelopes and drawer structures. A particular feature of the material may be that it is durable enough to withstand continuous pulling of the drawer structures through the opening in the internal envelope. The substrate may be formed of paper materials including but not limited to paperboard, chipboard, cardboard, fiberboard, natural fibers, mineral fibers or any combination thereof. The material may be a virgin material, a post-consumer recycled material, or both. The substrate material may be a recyclable material and/or a biodegradable material. If the substrate material includes paperboard, the paperboard may be a bleached or unbleached paperboard. For example it may be a solid bleached sulfate (SBS) paperboard. The material may contain a major portion that can be recycled. The material may be free of any polymeric coatings or any other coatings that would render the packaging non-biodegradable.

The substrate material may be formed of a polymeric material including but not limited to thermoplastics, thermoset plastics, elastomeric containing materials or any combination thereof. Examples of polymeric materials that may be employed include polyamide, polyester, polystyrene, polyethylene (including polyethylene terephthlate, high density polyethylene and low density polyethylene), polypropylene, polyvinyl chloride, bio-based plastics/biopolymers (e.g., poly lactic acid), silicone, acrylonitrile butadiene styrene (ABS), or any combination thereof.

The gauge of the material may vary depending on the size of the carrier or the desired strength of the packaging. As an example, if the material includes paperboard, the gauge of the paperboard may be greater than about 14 point paperboard. The gauge of the paperboard may be less than about 22 point paperboard.

The packaging may also include designs or coverings to add a decorative element to any of the shell portion, the internal envelopes, and/or the drawer structures. The packaging may include designs and information attributable to the contents of the packaging. As an example, in the case of a DVD packaging, the top surface of the shell portion may include the title and a photo or design related to the film contained herein, while the remaining shell portion surfaces may include additional design and information relating to the film within. In such an example, the internal envelopes, the drawer structures, or both may also contain additional information, design attributes or photos from the film including stills, scene synopses, reviews, credits or the like. Any coating or other design element may be attached to any surface of the packaging via an adhesive. Any coating or other design element may be ink jet or laser printed directly onto any surface of the packaging. Any surface of the packaging may be embossed, printed, silkscreened, or engraved with a design element. Any design element or coating may be customizable. Any coating or design element may include a pre-loaded adhesive material or other attachment means for simplified placement of the coating or design element onto the packaging.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A packaging comprising:
    a shell portion having a first surface, a connecting surface and a second surface wherein the connecting surface connects the first surface and second surface;
    one or more internal envelopes, each internal envelope having:
        (i) a first panel having an outside edge, an inside edge and at least one side edge;
        (ii) a second panel having an outside edge, an inside edge and at least one side edge wherein the outside edge of the second panel connects to the outside edge of the first panel to form an outside edge of the internal envelope;
        (iii) an opening located in the outside edge of the internal envelope, the opening extending along only a portion of the outside edge so that the first panel and second panel remain connected along portions of the outside edge;
    one or more drawer structures, each drawer structure located within a respective one of the one or more internal envelopes;
    wherein the drawer structure can be moved to an open position by pulling at least a portion of the drawer structure through the opening in the outside edge of the respective internal envelope.

2. The packaging of claim 1, wherein the drawer structure includes a receiving surface and a retaining structure located in planar contact with the receiving surface.

3. The packaging of claim 2, wherein the drawer structure includes a first folded edge located adjacent the receiving surface and a second folded edge located adjacent the receiving surface and opposing the first folded edge.

4. The packaging of claim 3, wherein the first folded edge folds over an item located within the drawer structure so that direct contact with the item is minimized when the drawer structure is pulled through the opening in the outside edge of the internal envelope.

5. The packaging of claim 3, wherein the second folded edge folds over an item located within the drawer structure so that the item is maintained within the confines of the retaining structure.

6. The packaging of claim 2, wherein the drawer structure includes at least one tab integrally formed with the retaining structure.

7. The packaging of claim 6, wherein the at least one tab contacts at least one support structure when the drawer structure is in the open position to maintain at least a portion of the drawer structure within the internal envelope.

8. The packaging of claim 7, wherein the at least one tab prevents the drawer structure from being completely removed from the internal envelope.

9. The packaging of claim 2, wherein the internal envelope includes at least one support structure.

10. The packaging of claim 9, wherein the at least one support structure is located adjacent to and in direct contact with the retaining structure.

11. A method for packaging an item comprising the steps of:
    providing the packaging of claim 1 including the drawer structure having a receiving surface and a retaining structure located in planar contact with the receiving surface;
    locating the drawer structure within the respective internal envelope.

12. The method of claim 11, wherein one or more tabs are integrally formed with the retaining structure.

13. The method of claim 12, wherein the one or more tabs prevent the drawer structure from being completely removed from the internal envelope.

14. The method of claim 11, wherein one or more support structures are located in between and in direct planar contact with both of the first panel and second panel.

15. The method of claim 11, wherein the internal envelope includes an inside edge and the internal envelope is attached to at least a second internal envelope along their inside edges to form the packaging.

16. A packaging comprising:
    a shell portion having a first surface, a connecting surface and a second surface wherein the connecting surface connects the first surface and second surface;
    one or more internal envelopes, each internal envelope having:
        (i) a first panel having an outside edge, an inside edge and at least one side edge;
        (ii) a second panel having an outside edge, an inside edge and at least one side edge wherein the outside edge of the second panel connects to the outside edge of the first panel to form an outside edge of the internal envelope;
        (iii) an opening located in the outside edge of the internal envelope;
        (iv) at least two support structures located between the first panel and the second panel and forming at least two closed side edges between the first and second panels;
    one or more drawer structures, each drawer structure located within a respective one of the one or more internal envelopes, each drawer structure having:
        (i) a receiving surface;
        (ii) a first folded edge located adjacent the receiving surface;

(iii) a second folded edge located adjacent the receiving surface and opposing the first folded edge;
(iv) a retaining structure in planar contact with the receiving surface;
(v) at least one tab integrally formed with the retaining structure;

wherein the drawer structure can be moved to an open position by pulling at least a portion of the drawer structure through the opening in the outside edge of the respective internal envelope.

17. The packaging of claim 16, wherein the at least one tab prevents the drawer structure from being completely removed from the internal envelope.

\* \* \* \* \*